(12) United States Patent
Nueman, Jr. et al.

(10) Patent No.: US 8,875,751 B1
(45) Date of Patent: Nov. 4, 2014

(54) STORAGE AND DISPENSING CONTAINER (75) Inventors: Moses Nueman, Jr., Gastonia, NC (US); Wayne Grubaugh, Jr., Gastonia, NC (US)

(73) Assignee: Moses Nueman, Jr., Gastonia, NC (US)

( * ) Notice: Subject to any disclaimer, the term of this patent is extended or adjusted under 35 U.S.C. 154(b) by 781 days.

(21) Appl. No.: 13/170,381

(22) Filed: Jun. 28, 2011

Related U.S. Application Data (60) Provisional application No. 61/359,061, filed on Jun. 28, 2010.

(51) Int. Cl.
*B65B 1/04* (2006.01)

(52) U.S. Cl.
USPC ........... 141/104; 141/106; 141/332; 141/333; 141/340; 141/366; 222/130; 222/144; 222/145.1; 222/462

(58) Field of Classification Search
USPC ......... 141/100, 104, 105, 106, 331, 332, 333, 141/340, 363–366; 206/219; 222/130, 143, 222/144, 145.1, 460, 462
See application file for complete search history.

(56) References Cited

U.S. PATENT DOCUMENTS

| | | | | |
|---|---|---|---|---|
| 3,567,076 A | * | 3/1971 | Zanussi | 222/144 |
| 6,705,491 B1 | * | 3/2004 | Lizerbram et al. | 222/145.1 |
| 8,534,502 B2 | * | 9/2013 | Gold et al. | 222/144 |
| 2006/0226035 A1 | * | 10/2006 | Smith et al. | 206/219 |

* cited by examiner

*Primary Examiner* — Jason K Niesz
(74) *Attorney, Agent, or Firm* — Trego, Hines & Ladenheim, PLLC

(57) ABSTRACT

A storage and dispensing container includes: a housing having a bottom plate with a feed opening defined therein, and a generally cylindrical outer wall extending around an outer periphery of the bottom plate; a funnel disposed at a lower end of the housing, in flow communication with the feed opening; a drum having an outer wall defining an interior that is partitioned into at least two chambers which are open at upper and lower ends thereof, the wall including a cylindrical portion which is coupled to the outer wall of the housing, such that the drum is rotatable relative to the housing; and a removable cap which closes off the upper end of the drum.

14 Claims, 12 Drawing Sheets

STORAGE AND DISPENSING CONTAINER

CROSS-REFERENCE TO RELATED APPLICATIONS

This application claims the benefit of Provisional Patent Application No. 61/359,061, filed Jun. 28, 2010.

BACKGROUND OF THE INVENTION

This invention relates generally to storage containers and more particularly to a storage container adapted to measure and dispense a flowable material.

For various reasons there is a need to store and dispense flowable materials, such as granules, particulates, powders, or liquids. For example, nutritional supplements, infant formula, and beverage mixes are often supplied as powders that must be mixed with water in specified proportions before use. Frequently these products are used away from a kitchen or other location where measuring implements are available. It is thus helpful to store a pre-measured quantity of the particular product ready for mixing. It is also desirable in many circumstances to store several identical portions of the same product for use throughout a day or week.

Numerous types of containers are known which are capable of storing and/or dispensing flowable materials. However, known containers do not provide a convenient way of storing several identical portions, nor do they provide a convenient way of loading multiple portions without repeated measuring.

BRIEF SUMMARY OF THE INVENTION

These and other shortcomings of the prior art are addressed by the present invention, which provides a container useful for storing and dispensing measured amounts of flowable material.

According to one aspect of the invention, a storage and dispensing container includes: a housing having a bottom plate with a feed opening defined therein, and a generally cylindrical outer wall extending around an outer periphery of the bottom plate; a funnel disposed at a lower end of the housing, in flow communication with the feed opening; a drum having an outer wall defining an interior that is partitioned into at least two chambers which are open at upper and lower ends thereof, the wall including a cylindrical portion which is coupled to the outer wall of the housing, such that the drum is rotatable relative to the housing; and a removable cap which closes off the upper end of the drum.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
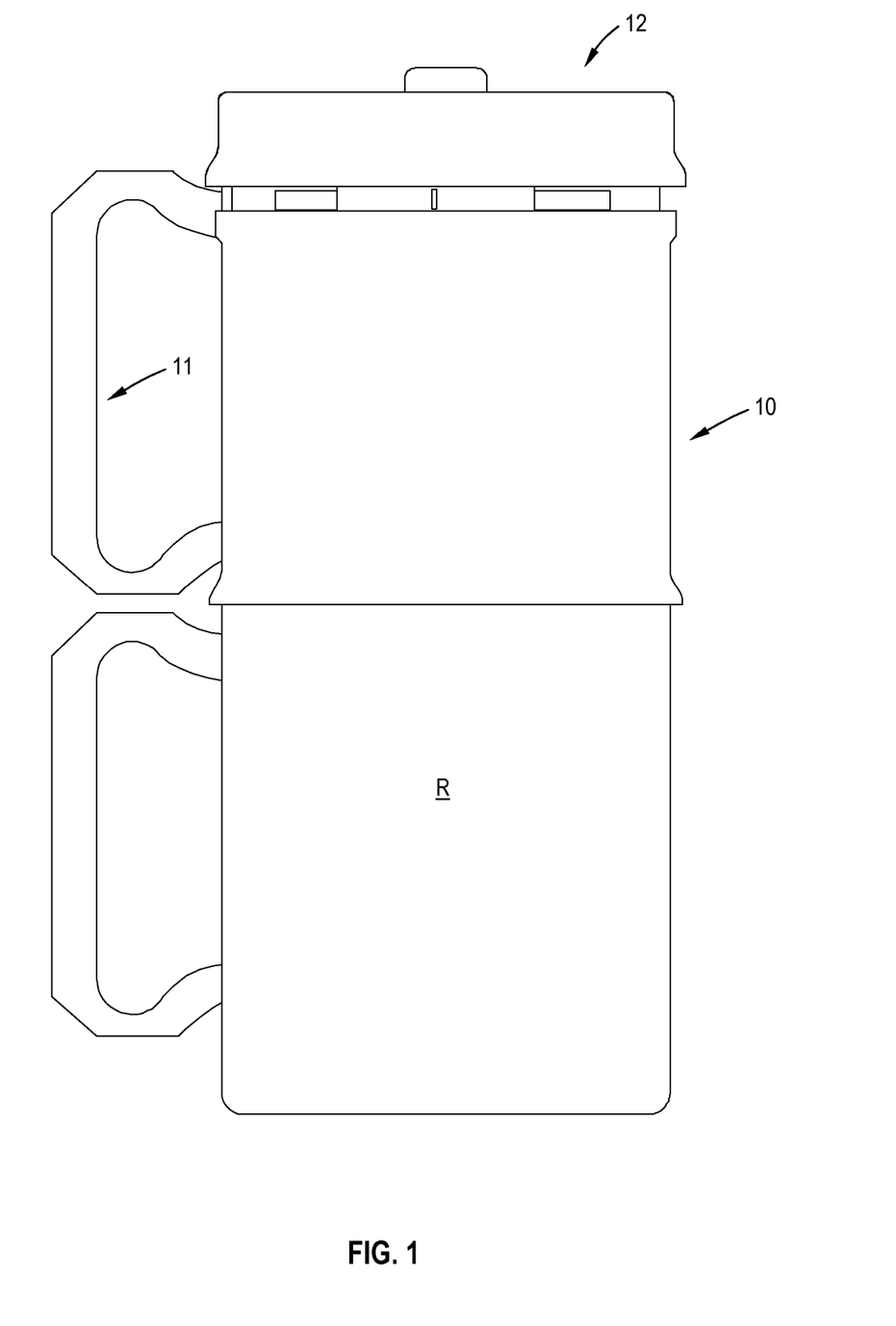
FIG. 1 is a side view of a storage and dispensing container constructed in accordance with an aspect of the present invention.
Figure 2:
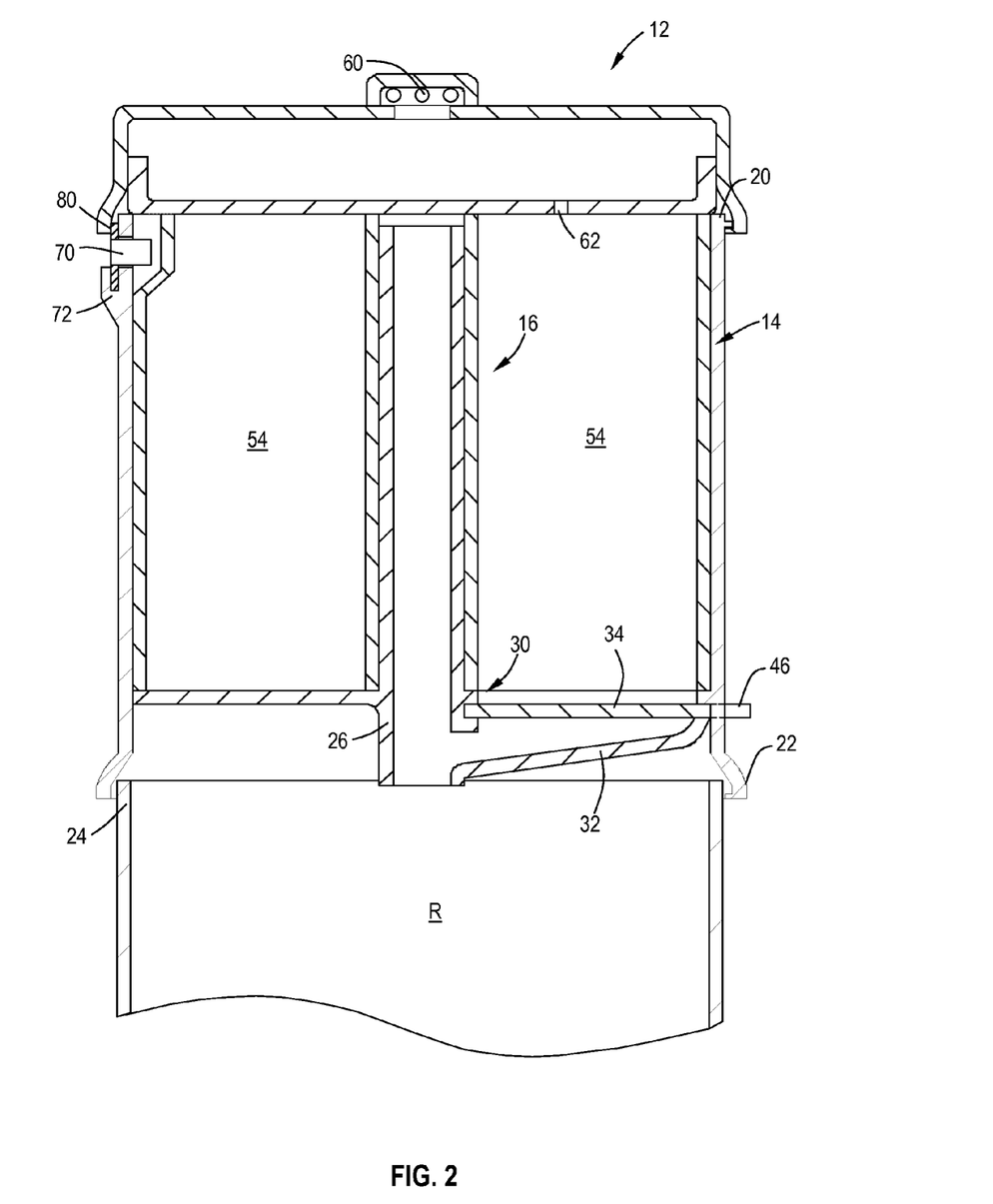
FIG. 2 is a front cross-sectional view of the container of FIG. 1.
Figure 3:
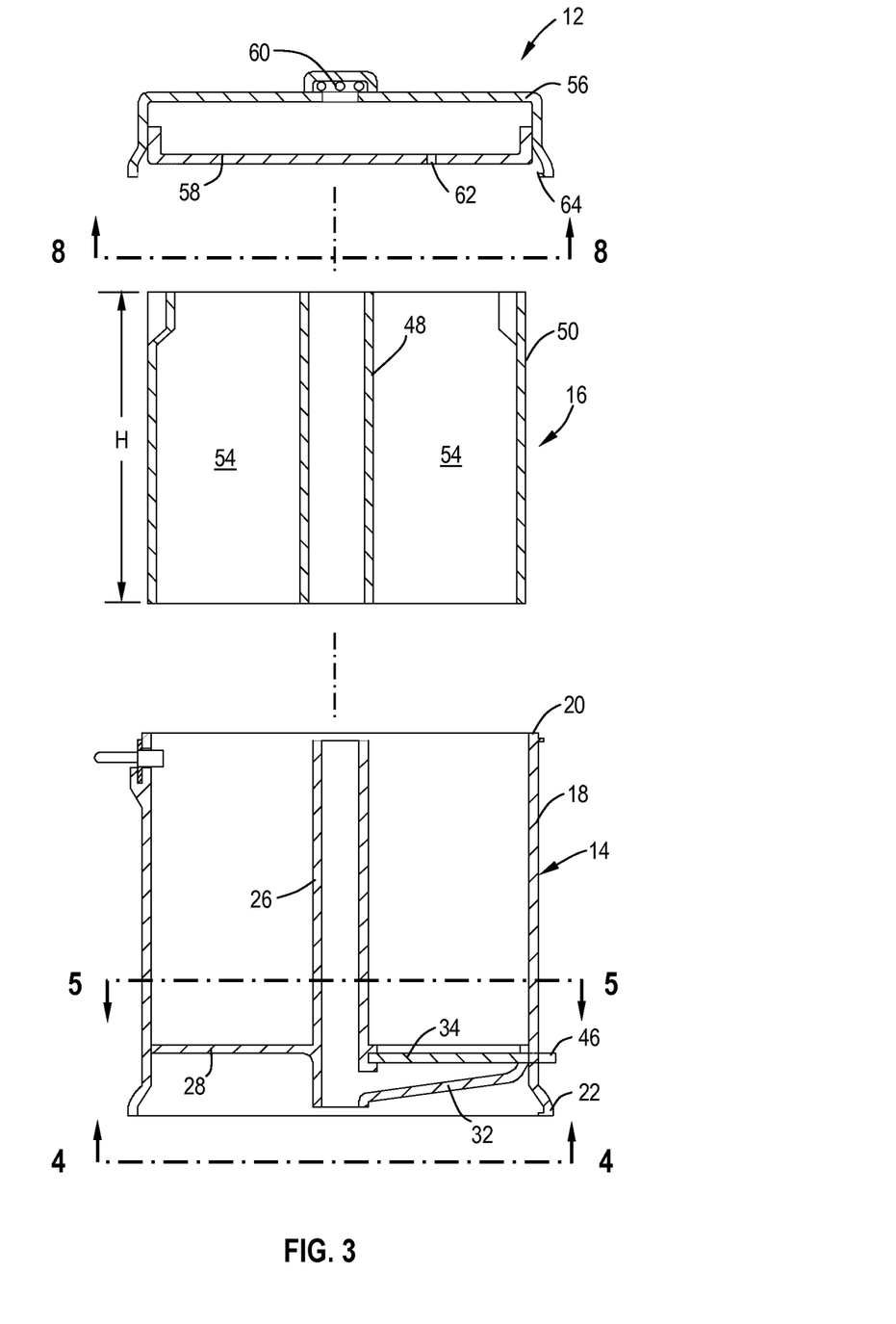
FIG. 3 is an exploded cross-sectional view of the container of FIG. 1.

Referring to the drawings wherein identical reference numerals denote the same elements throughout the various views, FIGS. 1-3 depict an exemplary storage and dispensing container constructed according to an aspect of the present invention, referred to hereinafter simply as a "container" 10. The container has a cap 12 placed over its upper end and is shown placed over a receptacle "R", such as a mug or cup.

The container 10 is suitable for storing and selectively dispensing any type of flowable material. As used herein the term "flowable material" refers to any substance which is capable of deforming under shear stress and flowing, such as granular materials, particulates, powders, and liquids.

Figure 4:
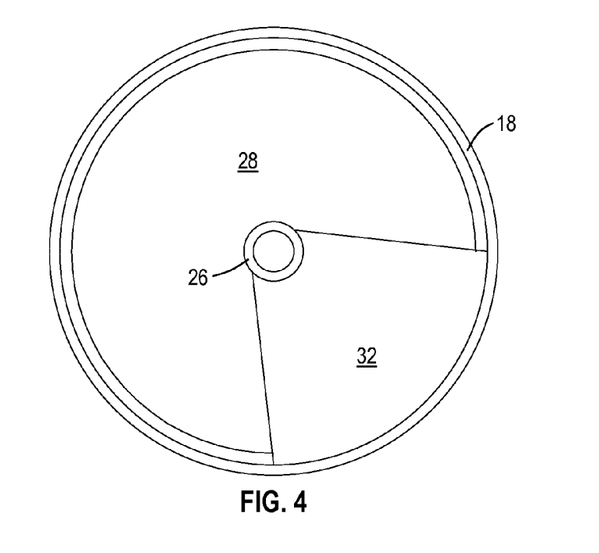
FIG. 4 is a bottom plan view of the container shown in FIG. 3.
Figure 5:
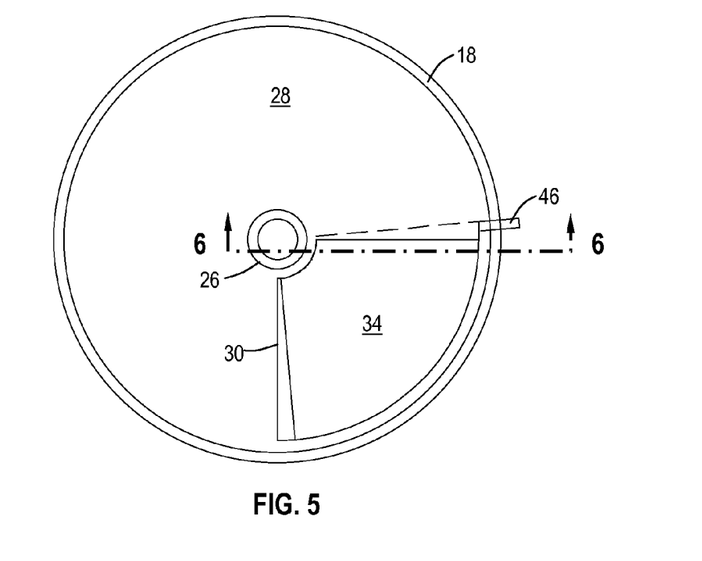
FIG. 5 is a view taken along lines 5-5 of FIG. 3.
Figure 6:
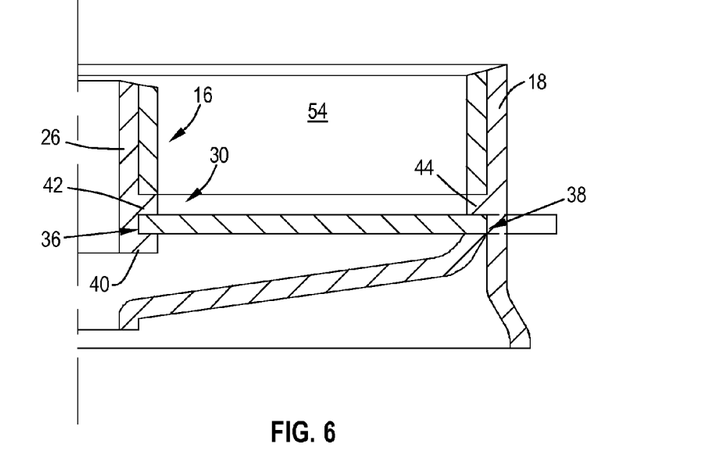
FIG. 6 is a cross-sectional view taken along lines 6-6 of FIG. 5.

Referring to FIGS. 1-3, the container 10 comprises a housing 14 with a rotating drum 16 disposed therein. A carrying handle 11 may be incorporated with the container 10. The housing 14 has a generally cylindrical wall 18 with an upper rim 20 and a lower edge that is formed into a flared lip 22. The lip 22 is capable of receiving the upper edge 24 of the receptacle R. An upright cylindrical tube 26 is disposed in the center of the housing 14. The housing 14 and other constituent parts of the container 10 may be made from any material which is sufficiently rigid to maintain the required shapes. Nonlimiting examples include plastic, metal, fiberboard, and the like. The various components of the container 10 may be formed as an integral whole (for example by injection molding) or may be formed separately and then assembled, for example using adhesives, snap- or friction-fit joints, bonding processes (e.g. thermal or ultrasonic), or mechanical fasteners. As best seen in FIG. 3, the tube 26 is held in place within the housing 14 by a bottom plate 28 which is generally circular. A wedge-shaped segment is removed from the bottom plate 28 to define a feed opening 30 (see FIG. 5). In the illustrated example the feed opening 30 spans an angle of about 90 degrees. A funnel 32 is disposed underneath the bottom plate 28 (see FIG. 4). In plan view the funnel 32 is generally wedge-shaped and is centered under the feed opening 30. The funnel 32 is formed so as to transition smoothly into the lower end of the tube 26.

A valve 34 is provided to selectively open or close off the feed opening 30 as desired. In the illustrated example the valve 34 is a wedge-shaped plate with arcuate inboard and outboard edges 36 and 38. The valve 34 spans an angle slightly larger than the angle of the feed opening 30. The inboard edge 36 is supported by a retaining ring or ledge 40, which may be part of the tube 26, and the outboard edge 38 is supported by an outer edge of the funnel 32. Arcuate rails 42 and 44 on the tube 26 and the wall 18 retain the inboard and outboard edges 36 and 38, respectively. In this example the valve 34 is mounted at approximately the same plane as the remainder of the bottom plate 28. Mounted in this fashion, the valve 34 is able to move along an arcing path. Means are provided for moving the valve 34 between positions. In the illustrated example, a tab 46 formed as part of the valve 34 extends through an arcuate slot in the wall 18 of the housing 14 to allow manual operation of the valve 34.

FIG. 3 shows the drum 16 in more detail. It is generally cylindrical with concentric generally cylindrical inner and outer walls 48 and 50. The inside diameter of the inner wall 48 is sized to fit closely over the tube 26, and the outside diameter of the outer wall 50 is sized to fit closely within the wall 18 of the housing 14, so that the drum 16 can rotate freely within the housing 14. Partitions 52 (see FIG. 7) extend between the inner and outer walls 48 and 50 so as to divide the annular space between the two walls into a plurality of chambers 54 which are open at both ends. The number and size of the chambers 54 may be chosen to suit a particular application. The overall volume of the chambers 54 may also be adjusted by scaling of the overall height "H" (see FIG. 3) of the drum 16. As described in more detail below, it may be desirable to provide a particular total drum capacity either through a small number of large chambers 54 or a large number of small chambers 54. The number of chambers 54, and thus the angle spanned by each chamber 54, matches the angle spanned by the feed opening 54. In the illustrated example, the drum 16 is divided into four chambers 54. It is also possible to divide the interior of the drum 16 into chambers 54 of unequal sizes.

Figure 8:
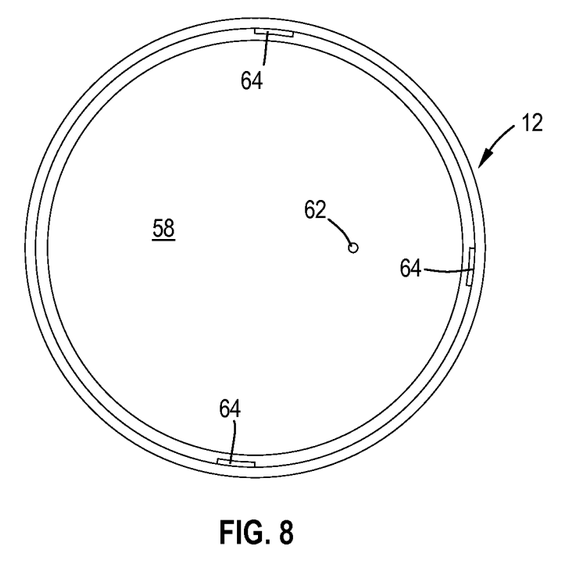
FIG. 8 is a view taken along lines 8-8 of FIG. 3.

The cap 12 includes a generally circular outer shell 56 with a generally "U"-shaped cross section, and an inner liner 58 with a similar cross-sectional shape. A vent 60 is provided through the outer shell 56 and may be of a shielded type as shown. One or more vent holes 62 (only one is shown) pass through the inner liner 58 (see FIG. 8). When assembled to the container 10, the cap 12, specifically the inner liner 58, seals against the upper edges of the drum 16 and the wall 18 of the housing 14, to prevent spillage of any flowable material from the chambers 54.

The cap 12 may be provided with means to securely fasten it to the container 10. In the illustrated example, the cap 12 includes several spaced-apart lugs 64 which extend inward from the lip 22. The upper edge of the housing 14 includes corresponding lugs 66 (see FIG. 7). When the cap 12 is placed over the container 10 and rotated a fraction of a turn, the lugs 64 and 66 engage each other and hold the cap 12 and the container 10 together.

The container 10 is provided with means for rotating the drum 16. In the illustrated example, best seen in FIG. 7, the upper portion of the outer wall 50 of the drum 16 has an array of detent slots 68 formed therein.

Figure 7:
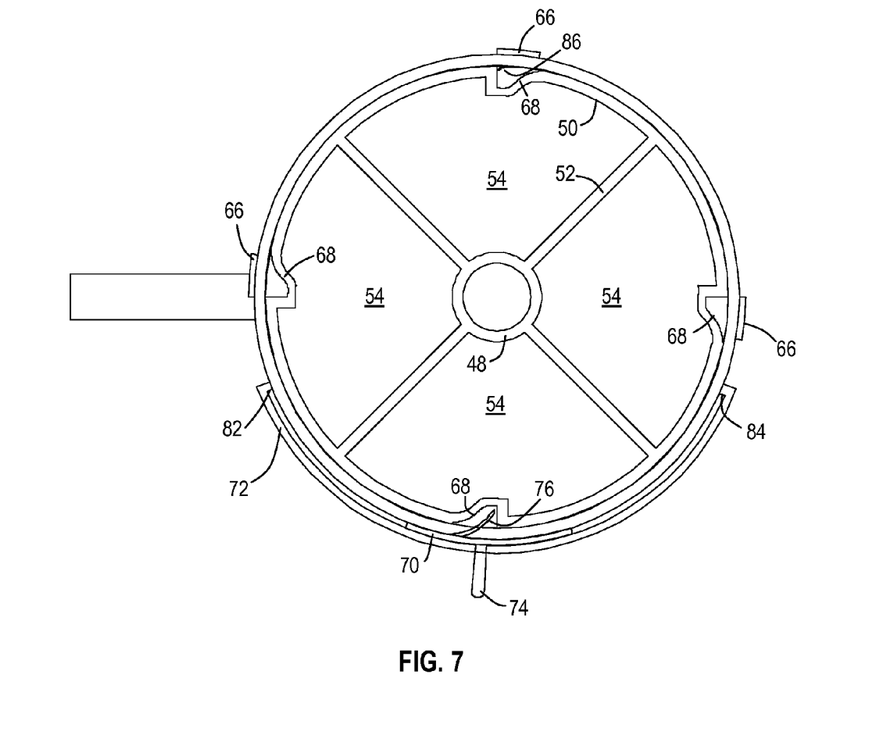
FIG. 7 is a top plan view of the container.

A slider 70 is carried by the housing 14 near the upper rim 20. As seen in FIGS. 2 and 7, the wall 18 incorporates a lower slider track 72 around part of its periphery. The slider 70 is an arcuate band with an outwardly-protruding handle 74 and an inwardly-protruding, resilient finger 76. The lower edge of the cap 12 defines an upper slider track 80. Cooperatively, the upper and lower slider tracks 72 and 80 restrain the slider 70 in position and allow it to move in an arc between fixed stops 82 and 84, with the finger 76 bearing against the outer wall 50 of the drum 16. Moving the slider 70 in one direction allows the finger 76 to slip past the detent slots 68, while moving it in the opposite direction causes the finger to engage one of the detent slots and thereby cause the drum 16 to rotate along with the slider 70. Preferably, the fixed stops 82 and 84 and the size of the slider 70 are selected so that a full cycle of motion between the fixed stops 82 and 84 will result in the drum 16 being indexed by exactly one chamber 54. In order to prevent backwards motion of the drum 16 during rotation, the housing 14 may be provided with a fixed resilient ratchet finger 86 that engages each detent slot 68 as it passes by during drum rotation.

Figure 9:
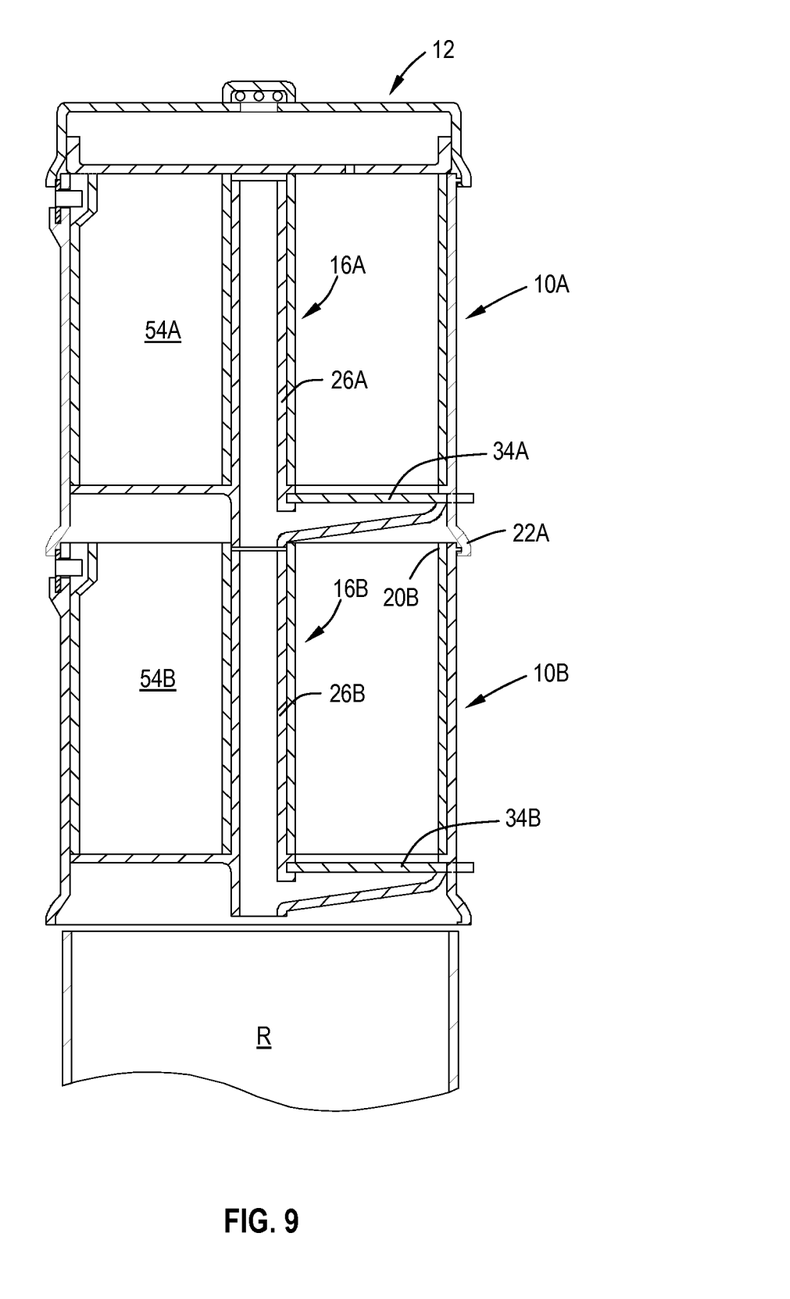
FIG. 9 is a cross-sectional view of two containers in a stacked assembly.

The container may be configured to be stackable. FIG. 9 shows an example of two identical containers labeled 10A and 10B, both identical in construction to the container 10 described above and having corresponding components. The upper container 10A is placed over top of the lower container 10B so that its lower flared lip 22A engages the upper rim 20B of the lower container 10B. If desired, the containers 10A and 10B may be provided with a twist-lock arrangement of lugs as described above. The cap 12 is then secured to the upper container 10A. The tubes 26A and 26B of the respective containers 10A and 10B form a continuous flowpath to the receptacle R. In the illustrated example, the tubes 26A and 26B are made slightly shorter than the height of the drums 16A and 16B so as to allow the tube 26A of the upper container 10A to nest into the lower container 10B. Using this arrangement, any number of containers 10A, 10B, etc. may be stacked.

Referring back to FIG. 2, the container 10 is used by removing the cap 12, making sure the valve 34 is in the closed position, and then filling the chambers 54 with the flowable material of choice. The individual chambers 54 are sized so as to provide multiple pre-measured portions without multiple measuring steps. For example, if a portion size of a particular nutritional supplement powder is about 89 ml (3 oz.), then each chamber 54 would be sized to contain exactly that volume. The entire container 10 can be dipped into a large package of the flowable material to overfill the chambers 54 and then scraped off level with a suitable implement. The cap 12 is then replaced and the container is ready for use. The container 10 keeps multiple individual portions of flowable material ready for dispensing.

To dispense material, the user simply places the container 10 over a suitable surface or receptacle R and slides the valve 34 to the open position. This allows the flowable material in the chamber 54 which is aligned with the valve 34 to flow past the valve 34 and through the feed opening 30 into the funnel 32, which guides the flowable material out through the tube 26. A path is provided from the vent 60 and the vent hole 62 into the active chamber 54 to ensure that the flowable material can flow freely. The valve 34 is then closed and the slider 70 is actuated to bring a full chamber 54 over the feed opening 30 ready to be dispensed.

The container 10 may be used for multiple measurements. For example, the individual chamber volume may be some integral fraction of a desired portion. In the example recited above where each chamber 54 holds about 89 ml (3 oz.), then dispensing the contents of two chambers 54 would produce a total of about 178 ml (6 oz.).

When using the containers in a stacked arrangement, flowable material can be dispensed without disassembling the containers. For example, referring to the containers 10A and 10B shown in FIG. 9, material may be dispensed from the upper container 10A by simply opening its valve 34A. The material will then flow through the tube 26A of the upper container 10A into the tube 26B of the lower container 10B and then into the receptacle R. In addition to simply providing additional storage capacity, this combination is also helpful if it is desired to dispense varying amounts of flowable material. For example, if each chamber 54B of the lower container 10B holds about 89 ml (3 oz.), and each chamber 54A of the upper container 10A holds about 59 ml (2 oz.), then discharging one chamber 54B and one chamber 54A will result in a total portion of about 148 ml (5 oz.).

Figure 10:
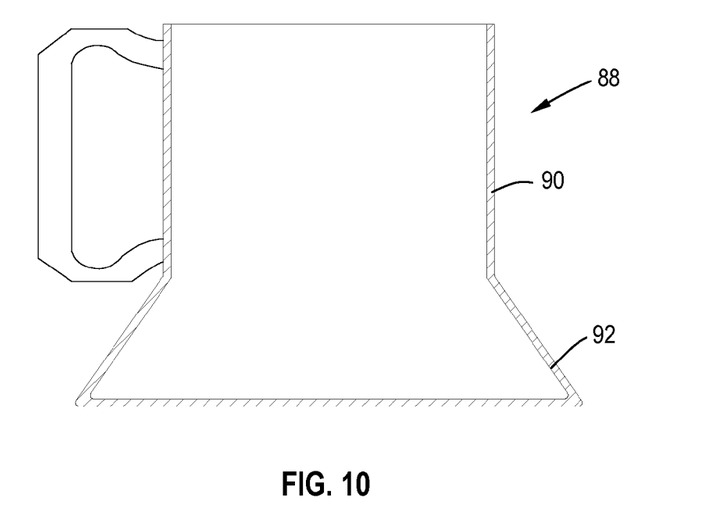
FIG. 10 is a cross-sectional view of an exemplary receptacle for use with the container.

As noted above the container 10 may be used to store and dispense any type of flowable material. One example of a flowable material would be a powdered nutritional supplement, beverage mix, or baby formula. FIG. 10 illustrates a cup 88 which incorporates a cylindrical upper portion 90 and a flared, frusto-conical lower portion 92. The shape of the cup 88 may be helpful in mixing such powdered materials with a liquid because of the mixing action imparted in the lower portion 92 when the cup 88 is swirled in a circular motion.

Figure 11:
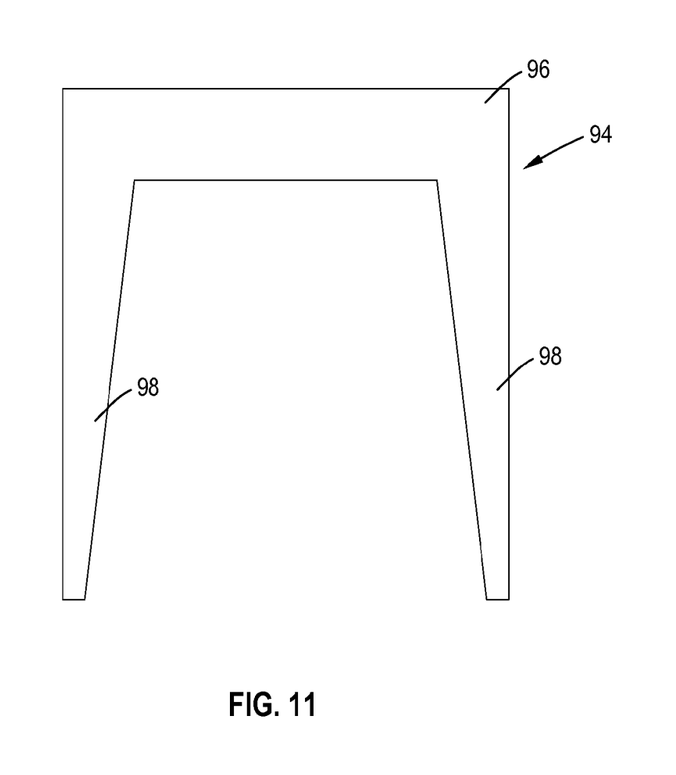
FIG. 11 is a cross-sectional view of an exemplary receptacle for use with the container.

The container 10 may also be used to store products such as spices, dry food mixes, or even chopped vegetables. In these situations it may be desirable to dispense the product onto a surface such as a countertop rather than directly into a receptacle. To accommodate this type of use the container 10 may be mounted on a stand 94 such as the one shown in FIG. 11. This incorporates a simple ring 96 with a plurality of legs 98 extending downward. In use the stand would be placed on the surface and the lip 20 of the container 10 placed over the top edge of the ring 96.

The container 10 may be scaled as needed to suit a particular application. While the examples above have described material capacities of several ounces, the same principals may be used to make containers having capacities of many pounds or even hundreds or thousands of pounds, using the appropriate structural materials.

Figure 12:
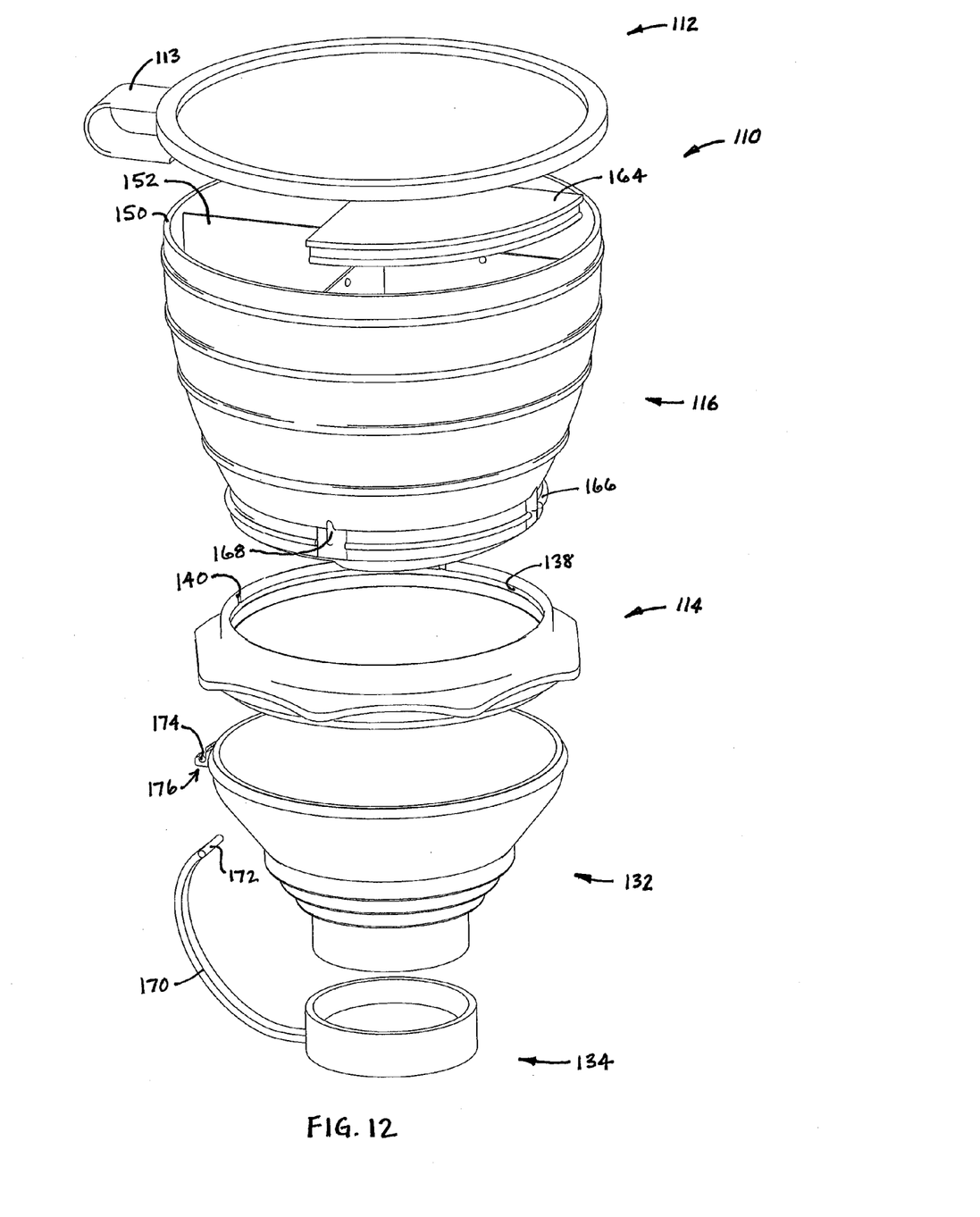
FIG. 12 is an exploded perspective view of an alternative storage and dispensing container constructed in accordance with an aspect of the present invention.
Figure 13:
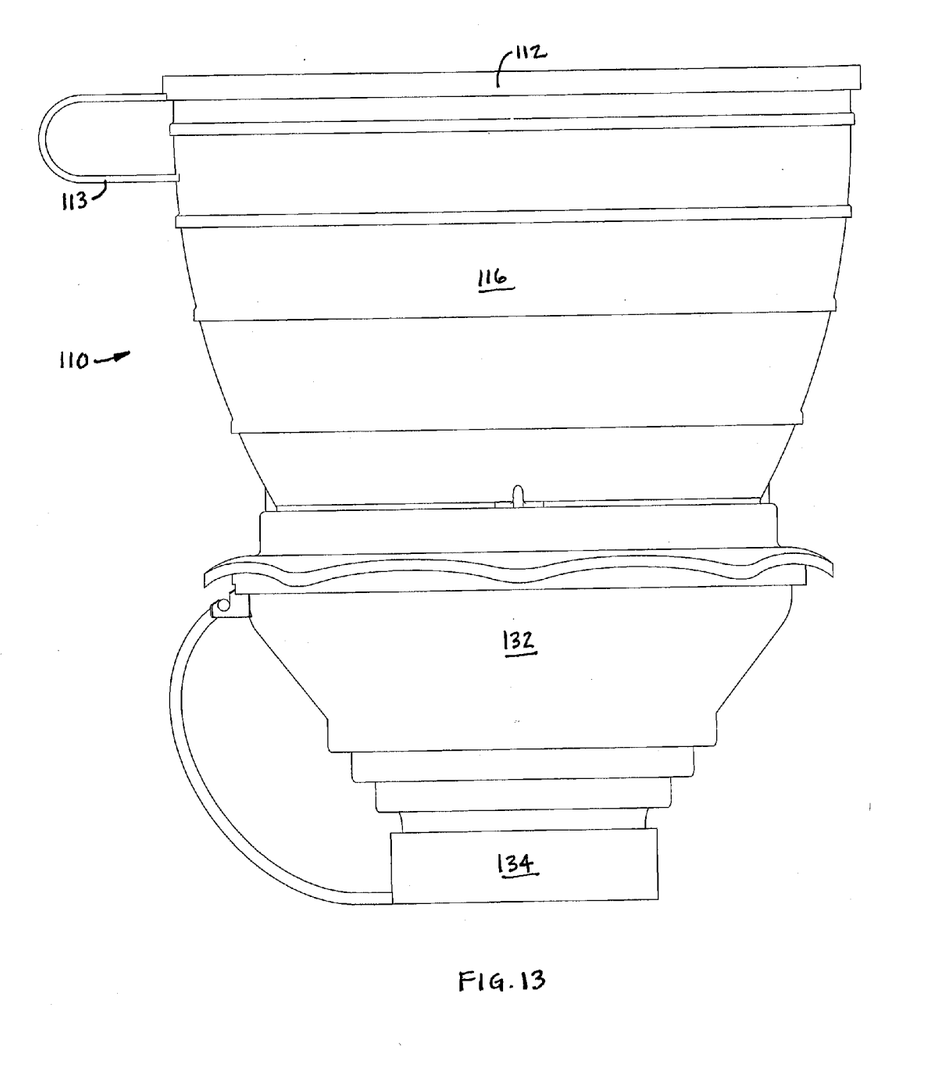
FIG. 13 is a side view of the container of FIG. 12.
Figure 14:
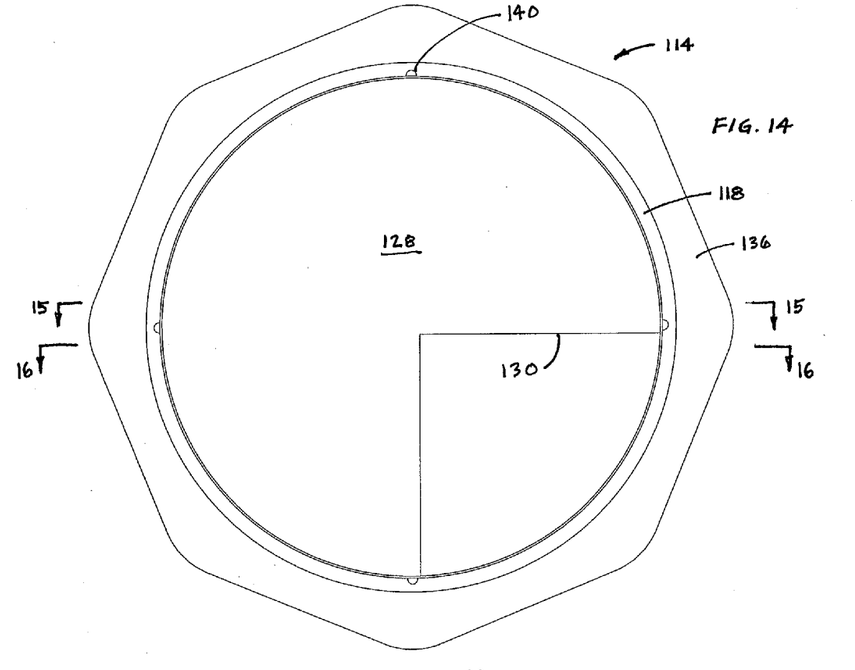
FIG. 14 is a top plan view of a housing of the container of FIG. 12.
Figure 15:
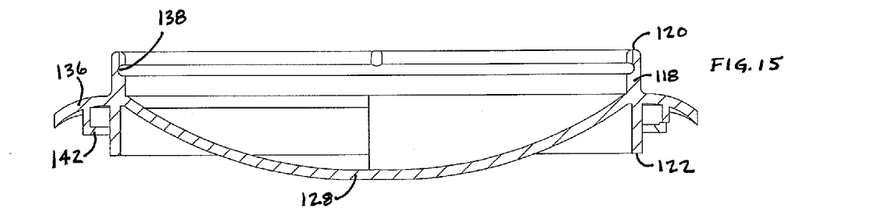
FIG. 15 is a view taken along lines 15-15 of FIG. 14.
Figure 16:
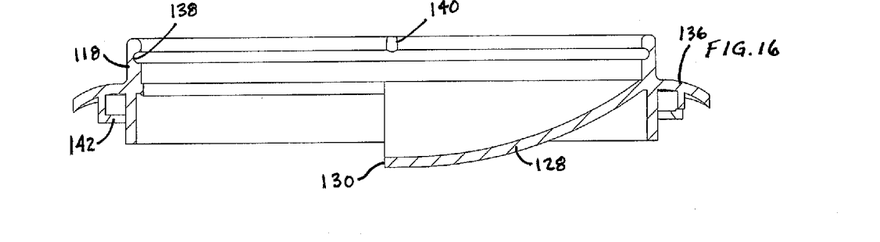
FIG. 16 is a view taken along lines 16-16 of FIG. 14.

FIGS. 12-17 illustrate an alternative container 110 constructed according to the principles of the present invention. Referring to FIGS. 12 and 13 in particular, the basic components of the container 110 are a housing 114, a drum 116, a funnel 132, a cap 112, and a bottom cap 134. In the illustrated example, a flexible tether 113 extends between the cap 112 and the drum 116.

The housing 114 (seen in FIGS. 14-16) has a generally cylindrical outer wall 118 with an upper edge 120 and a lower edge 122. The housing 114 and other constituent parts of the container 110 may be made from any material which is sufficiently rigid to maintain the required shapes. Nonlimiting examples include plastic, metal, fiberboard, and the like. The various components of the container 110 may be formed as an integral whole (for example by injection molding) or may be formed separately and then assembled, for example using adhesives, snap- or friction-fit joints, bonding processes (e.g. thermal or ultrasonic), or mechanical fasteners. A bottom plate 128 which is concave-curved and generally circular in plan view spans the interior of the outer wall 118. A wedge-shaped segment is removed from the bottom plate 128 to define a feed opening 130. In the illustrated example the feed opening 130 spans an angle of about 90 degrees. A handling flange 136 with a slight downward curvature extends radially outward from the exterior surface of the outer wall 118. The handling flange 136 provides a secure grip for manipulating the housing 114, and may have a generally polygonal or otherwise noncircular shape to prevent the container 110 from rolling if placed on its side. A groove 138 is formed in the interior surface of the outer wall 118. Short vertical notches 140 are spaced around the periphery of the outer wall's interior surface, at its upper edge 120. The number of notches 140 corresponds to the number of chambers 154 of the drum, as described below. An annular retention flange 142 with an L-shaped cross-section extends downward from the handling flange 136. It is spaced a short distance outboard of the outer wall 118 so as to accommodate the funnel 132.

Figure 17:
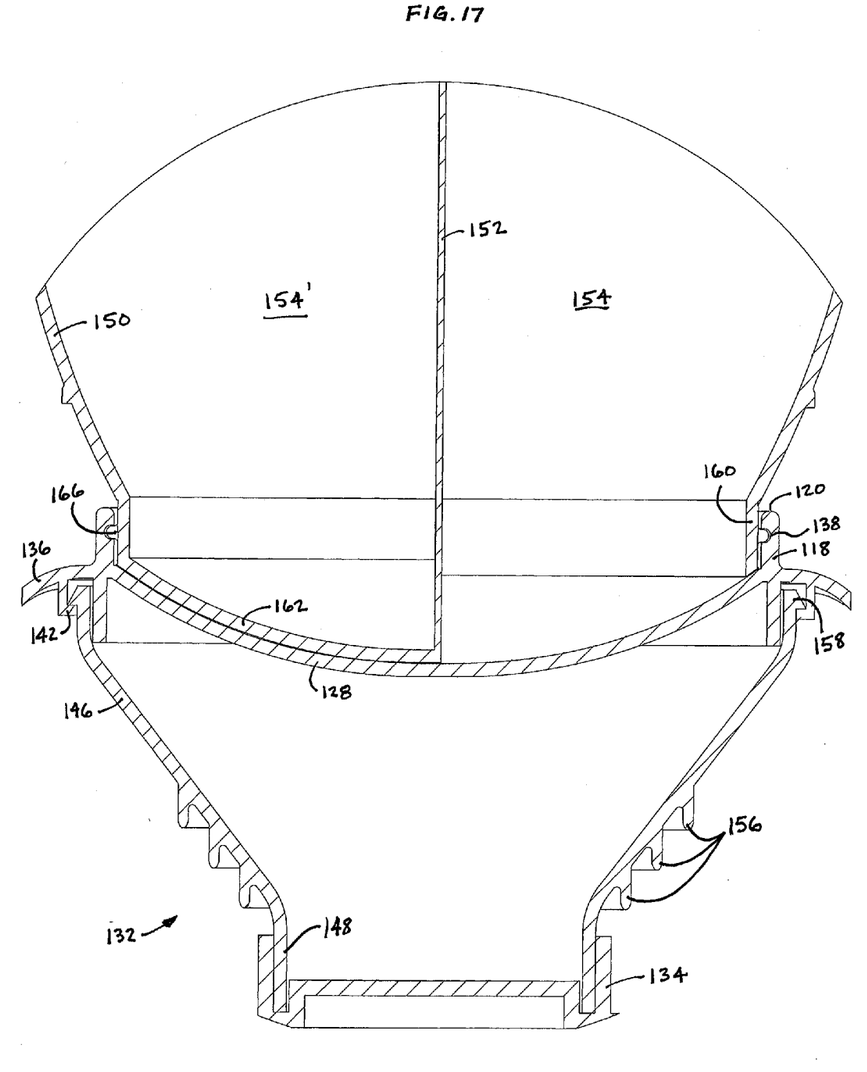
FIG. 17 is a cross-sectional view of a portion of the container shown in FIG. 12.

The funnel 132 is disposed underneath the bottom plate 128 (see FIG. 17). The funnel 132 has a generally frustoconical body 146 and a short generally cylindrical discharge tube 148 at its bottom end. A series of concentric annular rims 156 extend axially away from the body 146, near the discharge tube 148. The sizes of the rims 156 are selected so as to seat over the top edge of a receptacle such as a can, glass, or bottle (not shown). An annular, radially-outwardly-extending barb 158 is formed at the upper edge of the body 146.

The drum 116 is generally a body of revolution with an outer wall 150. In this example the drum 116 is tapered in diameter from top to bottom. The outer wall 150 defines a short generally cylindrical coupling tube 160 at its bottom end. The outside diameter of the coupling tube 160 is sized to fit closely within the outer wall 118 of the housing 114, so that the drum 116 can rotate freely within the housing 114. Partitions 152 extend across the interior of drum 116, so as to divide it into a plurality of chambers 154. The number and size of the chambers 154 may be chosen to suit a particular application. The overall volume of the chambers 154 may also be adjusted by scaling of the overall height of the drum 116. It may be desirable to provide a particular total drum capacity either through a small number of large chambers 154 or a large number of small chambers 154. The number of chambers 154, and thus the angle spanned by each chamber 154, matches the angle spanned by the feed opening 130. In the illustrated example, the drum 116 is divided into four chambers 154. All but one of the chambers 154 are open at both their top and bottom ends. One of the chambers 154' is closed off by an end wall 162, which closely conforms to the bottom wall 128 of the housing 114. A plug 164 (see FIG. 12) is installed in the top of this chamber 154' to close it off completely.

An annular flange 166 protrudes from the outer surface of the coupling tube 160. When assembled, the flange 166 engages the groove 138 of the housing 114 so as to couple the drum 116 and the housing 114 together and permit them to rotate relative to each other. One or more vertically-oriented ribs 168 (seen in FIG. 12) protrude from the outer surface of the coupling tube 160. When the drum 116 is rotated relative to the housing 114, the ribs 168 gently force the upper edge 120 of the outer wall 118 of the housing 114 outboard. When they are aligned with one of the notches 140, the ribs 168 and the notches 140 engage each other to hold the drum 116 in a desired position, acting as a detent mechanism. The notches 140 and ribs 168 are arranged so that one of the chambers 154 or 154' is aligned with the feed opening 130 in each of the "stopped" positions.

The bottom cap 134 is sized and shaped to close off the discharge tube 148 of the funnel 132 in a snap or press fit, and to be readily removable. In the illustrated example, a flexible tether 170 (seen in FIG. 12) extends between the bottom cap 134 and the housing 114, and is coupled to the housing by pins 172 pivoted in grooves 174 of a lug 176 of the housing 114.

Referring back to FIG. 12, the container 110 is used by removing the cap 112, making sure the drum 116 is turned so that the closed chamber 154' is over the feed opening 130, and then filling the chambers 154 with the flowable material of choice. The individual chambers 154 are sized so as to provide multiple pre-measured portions without multiple measuring steps. For example, if a portion size of a particular nutritional supplement powder is about 89 ml (3 oz.), then each chamber 154 would be sized to contain exactly that volume. The entire container 110 can be dipped into a large package of the flowable material to overfill the chambers 154 and then scraped off level with a suitable implement. The cap 112 is then replaced and the container is ready for use. The container 110 keeps multiple individual portions of flowable material ready for dispensing.

To dispense material, the user simply removes the bottom cap 134, places the container 110 over a suitable surface or receptacle (not shown), and turns the drum 116 until one of the open chambers 154 is over the feed opening 130. This allows the flowable material in the chamber 154 to flow through the feed opening 130 into the funnel 132, which guides the flowable material out through the tube 126. An air flow path can be provided into the active chamber 154 to ensure that the flowable material can flow freely. This may be done by providing a vent through the cap 112 (not shown) or by simply "cracking" or slightly opening the cap 112 while material is being dispensed. The bottom cap 134 is then replaced. Additional portions can be dispensed by again removing the bottom cap 134 and turning the drum 116 until another open chamber 154 is positioned over the feed opening 130.

The foregoing has described a storage and dispensing container. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:

1. A storage and dispensing container, comprising:
 a housing having a bottom plate with a feed opening defined therein, and a generally cylindrical outer wall extending around an outer periphery of the bottom plate, wherein the bottom plate includes a valve moveable between a closed position in which it blocks the feed opening and an open position which exposes the feed opening;
 a funnel disposed at a lower end of the housing, in flow communication with the feed opening;
 a drum having an outer wall defining an interior that is partitioned into at least two chambers which are open at upper and lower ends, the wall including a cylindrical portion which is coupled to the outer wall of the housing, such that the drum is rotatable relative to the housing; and
 a removable cap which closes off the upper end of the drum.

2. The container of claim 1 wherein a tab extends from the valve and is exposed outside the housing.

3. The container of claim 1 wherein:
 an upright cylindrical tube is disposed in a center of the housing; and
 the drum includes a generally cylindrical inner wall which fits over the tube.

4. The container of claim 1 wherein the funnel is formed integrally with the bottom plate.

5. A storage and dispensing container, comprising:
 a housing having a bottom plate with a feed opening defined therein, and a generally cylindrical outer wall extending around an outer periphery of the bottom plate;
 a funnel disposed at a lower end of the housing, in flow communication with the feed opening;
 a drum having an outer wall defining an interior that is partitioned into at least two chambers which are open at upper and lower ends, the wall including a cylindrical portion which is coupled to the outer wall of the housing, such that the drum is rotatable relative to the housing; and
 a removable cap which closes off the upper end of the drum;
 wherein the housing includes an upper rim and a lower lip, wherein the lower lip is sized to nest with the upper rim of a second, identical container in a stacked configuration.

6. A storage and dispensing container, comprising:
 a housing having a bottom plate with a feed opening defined therein, and a generally cylindrical outer wall extending around an outer periphery of the bottom plate;
 a funnel disposed at a lower end of the housing, in flow communication with the feed opening;
 a drum having an outer wall defining an interior that is partitioned into at least two chambers which are open at upper and lower ends, the wall including a cylindrical portion which is coupled to the outer wall of the housing, such that the drum is rotatable relative to the housing; and
 a removable cap which closes off the upper end of the drum, wherein the cap includes at least one vent formed therein communicating with the drum and the exterior of the container.

7. A storage and dispensing container, comprising:
 a housing having a bottom plate with a feed opening defined therein, and a generally cylindrical outer wall extending around an outer periphery of the bottom plate;
 a funnel disposed at a lower end of the housing, in flow communication with the feed opening;
 a drum having an outer wall defining an interior that is partitioned into at least two chambers which are open at upper and lower ends, the wall including a cylindrical portion which is coupled to the outer wall of the housing, such that the drum is rotatable relative to the housing; and
 a removable cap which closes off the upper end of the drum, wherein:
 the drum includes a plurality of detent slots formed in its outer wall; and
 a slider is carried in the housing in axial alignment with the detent slots, the slider being movable along an arc relative to the housing, the slider having an inwardly-protruding, resilient finger disposed in axial alignment with the detent slots, the finger arranged to pass over the detent slots when moved in a first direction, and to engage the detent slots when moved in a second direction opposite the first direction.

8. A storage and dispensing container, comprising:
 a housing having a bottom plate with a feed opening defined therein, and a generally cylindrical outer wall extending around an outer periphery of the bottom plate;
 a funnel disposed at a lower end of the housing, in flow communication with the feed opening, wherein the funnel has a generally frustoconical body with a cylindrical discharge tube at its bottom end;
 a drum having an outer wall defining an interior that is partitioned into at least two chambers which are open at upper and lower ends, the wall including a cylindrical portion which is coupled to the outer wall of the housing, such that the drum is rotatable relative to the housing, wherein one chamber of the drum is closed off at upper and lower ends thereof; and
 a removable cap which closes off the upper end of the drum.

9. A storage and dispensing container, comprising:
 a housing having a bottom plate with a feed opening defined therein, and a generally cylindrical outer wall extending around an outer periphery of the bottom plate;
 a funnel disposed at a lower end of the housing, in flow communication with the feed opening, wherein the funnel has a generally frustoconical body with a cylindrical discharge tube at its bottom end, and a drum having an outer wall defining an interior that is partitioned into at least two chambers which are open at upper and lower ends, the wall including a cylindrical portion which is coupled to the outer wall of the housing, such that the drum is rotatable relative to the housing; and a removable cap which closes off the upper end of the drum, wherein:

an annular, radially-outwardly-extending barb is formed at the upper edge of the body of the funnel; and the barb is engaged with an annular retention flange of the housing which has an L-shaped cross-section.

10. A storage and dispensing container, comprising:

a housing having a bottom plate with a feed opening defined therein, and a generally cylindrical outer wall extending around an outer periphery of the bottom plate;

a funnel disposed at a lower end of the housing, in flow communication with the feed opening wherein the funnel has a generally frustoconical body with a cylindrical discharge tube at its bottom end;

a drum having an outer wall defining an interior that is partitioned into at least two chambers which are open at upper and lower ends, the wall including a cylindrical portion which is coupled to the outer wall of the housing, such that the drum is rotatable relative to the housing; and a removable cap which closes off the upper end of the drum, wherein:

an annular groove is formed in an interior surface of the outer wall of the housing; and an annular flange protrudes from the outer surface of the outer wall of the drum, and engages the groove of the housing so as to couple the drum and the housing together.

11. The container of claim 10 wherein:

at least one notch is formed in the interior surface of the outer wall of the housing, near an upper edge thereof; and at least one rib protrudes from the outer surface of the outer wall of the drum, the rib shaped so as to engage the notch of the housing when the drum is turned to a predetermined position.

12. A storage and dispensing container, comprising:

a housing having a bottom plate with a feed opening defined therein, and a generally cylindrical outer wall extending around an outer periphery of the bottom plate;

a funnel disposed at a lower end of the housing, in flow communication with the feed opening wherein the funnel has a generally frustoconical body with a cylindrical discharge tube at its bottom end;

a drum having an outer wall defining an interior that is partitioned into at least two chambers which are open at upper and lower ends, the wall including a cylindrical portion which is coupled to the outer wall of the housing, such that the drum is rotatable relative to the housing;

a removable cap which closes off the upper end of the drum; and a removable bottom cap which closes off the discharge tube.

13. The container of claim 12 wherein the bottom cap is coupled to the housing by a flexible tether.

14. A storage and dispensing container, comprising:

a housing having a bottom plate with a feed opening defined therein, and a generally cylindrical outer wall extending around an outer periphery of the bottom plate;

a funnel disposed at a lower end of the housing, in flow communication with the feed opening wherein the funnel has a generally frustoconical body with a cylindrical discharge tube at its bottom end, wherein one or more concentric annular rims extend axially away from the body, near the discharge tube;

a drum having an outer wall defining an interior that is partitioned into at least two chambers which are open at upper and lower ends, the wall including a cylindrical portion which is coupled to the outer wall of the housing, such that the drum is rotatable relative to the housing; and a removable cap which closes off the upper end of the drum.

* * * * *